US012724136B2

(12) United States Patent
Pratt et al.

(10) Patent No.: US 12,724,136 B2
(45) Date of Patent: Sep. 1, 2026

(54) APPARATUS, SYSTEM, AND METHOD FOR IMPROVING RESOLUTION OF FREQUENCY-DEPENDENT OBJECTS IN RADAR CONTEXTS

(71) Applicant: University of Notre Dame du Lac, South Bend, IN (US)

(72) Inventors: Thomas G Pratt, South Bend, IN (US); Luke Saladis, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 308 days.

(21) Appl. No.: 18/438,082

(22) Filed: Feb. 9, 2024

(65) Prior Publication Data

US 2024/0272293 A1 Aug. 15, 2024
US 2025/0028035 A2 Jan. 23, 2025

Related U.S. Application Data

(60) Provisional application No. 63/484,275, filed on Feb. 10, 2023.

(51) Int. Cl.
*G01S 13/08* (2006.01)
*G01S 7/41* (2006.01)

(52) U.S. Cl.
CPC ............... *G01S 13/08* (2013.01); *G01S 7/411* (2013.01)

(58) Field of Classification Search
CPC ........ G01S 13/08; G01S 7/411; G01S 13/584; G01S 13/04; G01S 7/354; G01S 7/352; G01S 13/72
USPC ........................................................ 342/118
See application file for complete search history.

(56) References Cited

U.S. PATENT DOCUMENTS

| | | | | |
|---|---|---|---|---|
| H1005 H * | 12/1991 | Gerlach | 702/191 | |
| H1181 H * | 5/1993 | Rihaczek | G01S 7/411 | 342/195 |
| 5,508,706 A * | 4/1996 | Tsou | G01S 7/032 | 342/192 |
| 5,867,118 A * | 2/1999 | McCoy | G01S 7/411 | 342/90 |
| 6,448,923 B1 * | 9/2002 | Zrnic | G01S 13/951 | 342/195 |

(Continued)

FOREIGN PATENT DOCUMENTS

| | | | |
|---|---|---|---|
| EP | 3757597 A1 * | 12/2020 | G01S 7/023 |
| EP | 3943966 A1 * | 1/2022 | G01S 7/36 |

(Continued)

*Primary Examiner* — Nuzhat Pervin
(74) *Attorney, Agent, or Firm* — Greenberg Traurig, LLP

(57) ABSTRACT

A system for improving resolution of frequency-dependent objects in radar contexts may include a radar device configured to transmit a radar signal and receive a return of the radar signal. In one example, the system may also include circuitry configured to generate a first data set representative of a range profile based at least in part on the return and/or generate a second data set representative of the range profile by applying at least one shift to the first data set. Additionally or alternatively, the circuitry may be further configured to characterize at least one frequency-dependent object detected in the range profile based at least in part on the first data set and the second data set. Various other apparatuses, systems, and methods are also disclosed.

19 Claims, 5 Drawing Sheets

(56) References Cited

U.S. PATENT DOCUMENTS 6,498,581 B1 * 12/2002 Yu ........................ G01S 13/4463 342/147
7,355,546 B2 * 4/2008 Randall ................... G01S 7/024 342/195
7,548,071 B2 * 6/2009 Harrison .............. G01R 31/088 324/617
7,688,257 B1 * 3/2010 Christianson ......... G01S 7/4052 342/134
7,725,150 B2 * 5/2010 Tupin, Jr. ............ G01S 13/0209 600/407
8,082,286 B1 * 12/2011 Picciolo .................. G01S 7/292 708/305
8,314,732 B2 * 11/2012 Oswald ................. G01S 7/2926 342/195
8,362,942 B2 * 1/2013 McNeill .................... G01S 7/35 342/28
9,194,947 B1 * 11/2015 Mohamed ............... G01S 13/28
9,229,102 B1 * 1/2016 Wright .................. G01S 13/885
9,735,899 B2 * 8/2017 Moshe ................... H04B 17/12
9,860,054 B1 * 1/2018 Bradley .................... H04L 5/14
10,386,470 B2 * 8/2019 Zivkovic ............... G01S 13/931
10,613,198 B2 * 4/2020 Vacanti ................ G01R 29/105
10,718,861 B2 * 7/2020 Rick ....................... G01S 13/34
10,782,344 B2 * 9/2020 Liaw ................ G01R 31/31708
11,204,410 B2 * 12/2021 Jansen .................... G01S 13/34
11,215,694 B2 * 1/2022 Schat .................... G01S 7/4008
11,567,171 B1 * 1/2023 Carpenter ............... G01S 7/295
11,604,251 B2 * 3/2023 Puglielli ................. G01S 7/295
11,641,303 B2 * 5/2023 Bourdoux ............... H04L 5/001 342/194
11,841,455 B1 * 12/2023 Arool Emmanuel ........................ G01S 7/4013
11,933,876 B2 * 3/2024 Zhang ....................... G01S 7/35
12,189,026 B1 * 1/2025 Alferdaous Alazem ..................... G01S 7/403
12,189,052 B2 * 1/2025 Roger ................... G01S 13/931
12,265,175 B2 * 4/2025 Roger ..................... G01S 7/354
12,379,461 B2 * 8/2025 Lamontagne ........... G01S 13/86
2004/0118929 A1 * 6/2004 Edmonson ......... G06K 19/0672 235/492
2004/0249257 A1 * 12/2004 Tupin, Jr. ................. A61B 5/05 600/407
2004/0249258 A1 * 12/2004 Tupin, Jr. ................. A61B 5/05 600/407
2009/0262006 A1 * 10/2009 McNeill ............... A61B 5/0507 342/28
2010/0109938 A1 * 5/2010 Oswald ................. G01S 13/522 707/E17.014
2013/0113647 A1 * 5/2013 Sentelle .................. G01S 13/04 342/22
2015/0301167 A1 * 10/2015 Sentelle ............... A61B 5/0205 342/22
2015/0309166 A1 * 10/2015 Sentelle ................ G01S 13/888 342/22
2015/0331086 A1 * 11/2015 Hassen ..................... G01S 7/02 342/175
2017/0176590 A1 * 6/2017 Sharonov ................ G01S 13/87
2018/0143314 A1 * 5/2018 Pelletier ................... H01Q 3/04
2018/0259618 A1 * 9/2018 Jales ..................... G01S 15/104
2019/0018143 A1 * 1/2019 Thayer .................... G01S 17/89
2019/0086531 A1 * 3/2019 Rick ..................... G01S 13/583
2020/0249326 A1 * 8/2020 Bhaskaran ............ G01S 7/4815
2020/0278435 A1 * 9/2020 Wang .................... G01S 13/931
2020/0408891 A1 * 12/2020 Brett ..................... G01S 13/345
2021/0389445 A1 * 12/2021 Zhang ..................... G01S 13/34
2022/0026523 A1 * 1/2022 Heiss .................... G01S 7/0234
2022/0043112 A1 * 2/2022 Stokes ...................... G01S 7/10
2022/0099820 A1 * 3/2022 Hong ...................... G01S 7/354
2022/0128648 A1 * 4/2022 Li ........................... G01S 7/352
2022/0229152 A1 * 7/2022 Lamontagne ......... G01S 7/2883
2022/0342039 A1 * 10/2022 Eschbaumer ........... G01S 13/06
2022/0357423 A1 * 11/2022 Yang ....................... G01S 7/354
2022/0390582 A1 * 12/2022 Slobodyanyuk ...... G01S 13/426
2023/0090211 A1 * 3/2023 Alsindi ................... G01S 13/62 342/114
2023/0243921 A1 * 8/2023 Zoubi ..................... G01S 7/006 342/82
2023/0273296 A1 * 8/2023 Gupta ..................... G01S 7/023 342/93

FOREIGN PATENT DOCUMENTS

EP 3367124 B1 * 4/2023 ............... G08G 5/21
EP 4372406 A1 * 5/2024 ............. G01S 7/414
WO WO-2004107954 A2 * 12/2004 ......... G01S 13/0209
WO WO-2004109316 A2 * 12/2004 ........... A61B 5/0507
WO WO-2008093092 A2 * 8/2008 ........... G01S 13/522
WO WO-2017030616 A2 * 2/2017 ........... G01S 13/426
WO WO-2020160519 A1 * 8/2020 ........... G01S 7/4873

* cited by examiner

APPARATUS, SYSTEM, AND METHOD FOR IMPROVING RESOLUTION OF FREQUENCY-DEPENDENT OBJECTS IN RADAR CONTEXTS

PRIORITY CLAIM

This application claims the benefit of U.S. Provisional Application No. 63/484,275 filed Feb. 10, 2023, the disclosure of which is incorporated in its entirety by this reference.

GOVERNMENT LICENSE RIGHTS

This invention was made with government support under grant N00014-18-1-2134 awarded by the Office of Naval Research (ONR). The government has certain rights in the invention.

BACKGROUND

Frequency-dependent objects may pose a problem for some radar systems. For example, frequency-dependent objects may have and/or exhibit reflection and/or scattering coefficients that vary and/or change depending on the frequency of interacting electromagnetic waveforms. Unfortunately, the frequency dependence of such objects may lead to and/or cause depolarization that degrades processing resolution across polarimetric channels. In this example, such degraded processing resolution may result in filtering and/or ranging errors, skews, and/or misrepresentations. The instant disclosure, therefore, identifies and addresses a need for apparatuses, systems, and methods that improve resolution of frequency-dependent objects in radar contexts.

SUMMARY

As will be described in greater detail below, the instant disclosure generally relates to apparatuses, systems, and methods for improving resolution of frequency-dependent objects in radar contexts. In one example, a system for improving resolution of frequency-dependent objects in radar contexts may include a radar device configured to transmit a radar signal and receive a return of the radar signal. In this example, the system may also include circuitry configured to generate a first data set representative of a range profile based at least in part on the return and/or generate a second data set representative of a shifted range profile by applying at least one shift to the first data set. Additionally or alternatively, the circuitry may be configured to characterize at least one frequency-dependent object detected in the range profile based at least in part on the first data set and the second data set.

Similarly, a corresponding apparatus may include a radar device configured to transmit a radar signal and receive a return of the radar signal via one or more polarimetric channels. In one example, this apparatus may also include circuitry configured to generate a first data set representative of a range profile based at least in part on the return and/or generate a second data set representative of a shifted range profile by applying at least one shift to the first data set. Additionally or alternatively, the circuitry may be configured to characterize at least one frequency-dependent object detected in the range profile based at least in part on the first data set and the second data set.

A corresponding method may include (1) receiving, by a radar device, a return of a radar signal, (2) generating, by circuitry communicatively coupled to the radar device, a first data set representative of a range profile based at least in part on the return, (3) generating, by the circuitry, a second data set representative of a shifted range profile by applying at least one shift to the first data set, and (4) characterizing, by the circuitry, at least one frequency-dependent object detected in the range profile based at least in part on the first data set and the second data set.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF DRAWINGS

The accompanying drawings illustrate a number of example embodiments and are a part of the specification. Together with the following description, these drawings demonstrate and explain various principles of the instant disclosure.

Figure 1:
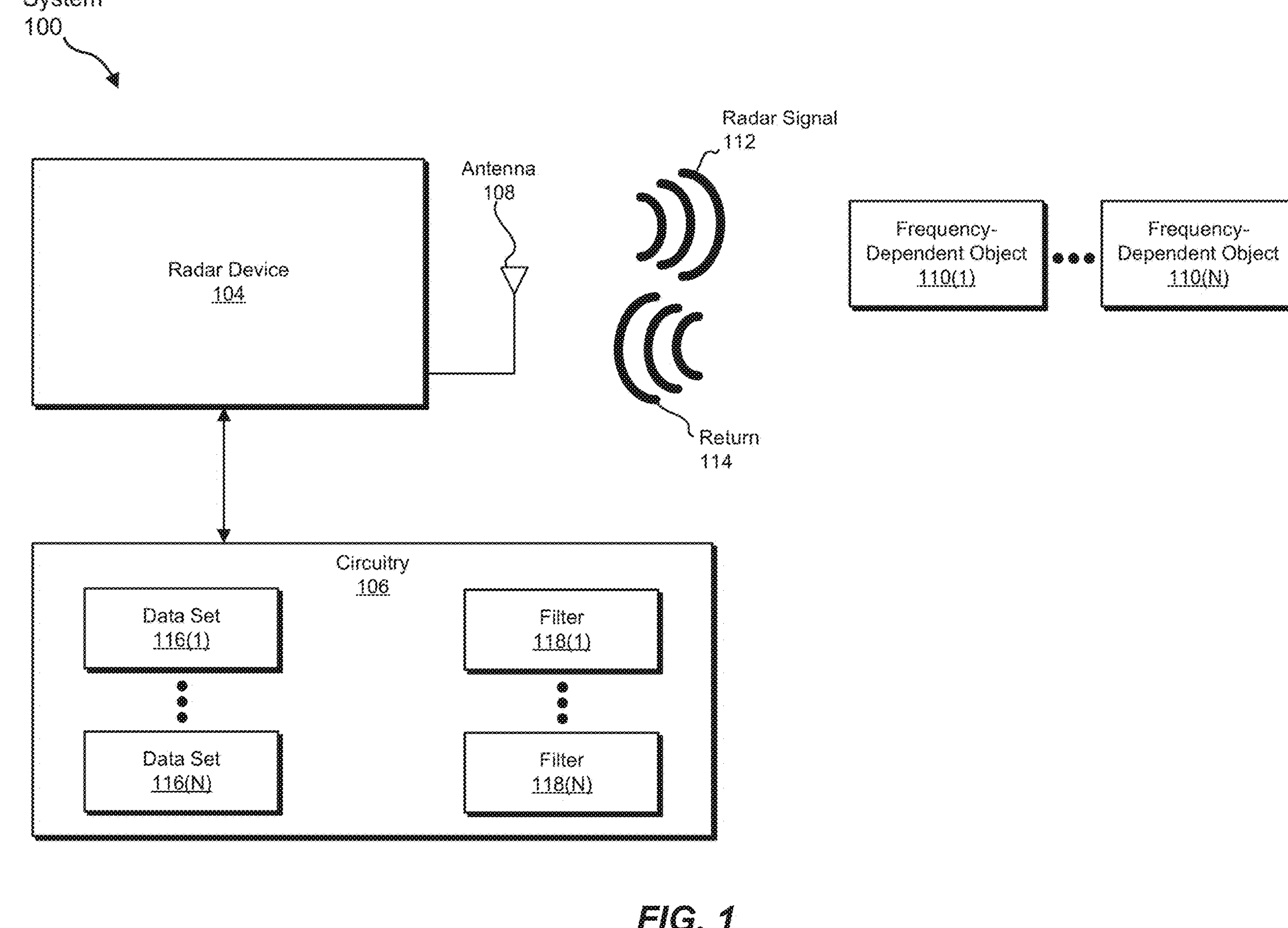
FIG. 1 is an illustration of an exemplary system for improving resolution of frequency-dependent objects in radar contexts according to one or more implementations of this disclosure.

While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to apparatuses, systems, and methods for improving resolution of frequency-dependent objects in radar contexts. In some examples, a frequency-dependent object may include and/or represent an object with a frequency-selective surface (e.g., the response from the scattering is frequency-dependent). In another example, a collection of unresolved scattering from a single object or responses from multiple unresolved objects may, in the aggregate, provide a frequency-dependent response. As will be explained in greater detail below, these apparatuses, systems, and methods may provide numerous features, benefits, and/or advantages.

In some examples, a system includes and/or represents a radar device that transmits a radar signal toward an environment and then receives a return and/or reflection of the radar signal. In one example, the system also includes and/or represents circuitry (e.g., a processing device) that is communicatively coupled to and/or incorporated in the radar device. In this example, the circuitry collects data and/or ranging samples based at least in part on the radar signal and/or the return.

In some examples, the circuitry generates a first data set representative of a range profile based at least in part on the radar signal and/or the return (e.g., by using a matched filter). In one example, the circuitry generates a second data set representative of the range profile by applying at least one shift and/or offset to the first data set (e.g., by using a shifted and/or offset matched filter). In this example, the circuitry characterizes at least one frequency-dependent object and/or multiple scatters whose responses have a frequency dependence in the aggregate based at least in part on the first data set and the second data set. Additionally or alternatively, the circuitry characterizes the polarization scattering response of scattering components comprising a frequency-dependent object.

As a specific example, the circuitry characterizes the frequency dependence of the object based on the first and second data sets. The circuitry then improves the resolution of the object by accounting and/or compensating for the frequency dependence. For example, the circuitry may mitigate depolarization of the radar device by accounting and/or compensating for the frequency dependence, thereby increasing the processing resolution across the radar device's polarimetric channels. In another example, the circuitry may modify the range profile provided by the radar device to provide increased resolution of object detection and/or ranging. Additionally or alternatively, the circuitry may mitigate and/or remove static interference or noise in certain ranges of interest represented in the range profile via range filtering. As a result of this mitigation and/or removal, the circuitry may be able to identify, detect, and/or resolve a previously unintelligible and/or obscured object in one of those ranges of interest. In certain implementations, range filtering may include, involve, and/or represent a technique and/or method for removing interference and clutter from radar returns originating from specific ranges with little, if any, effect on objects of interest.

The following will provide, with reference to FIGS. 1-4, detailed descriptions of exemplary apparatuses, devices, systems, components, and corresponding configurations or implementations for improving resolution of frequency-dependent objects in radar contexts. In addition, detailed descriptions of methods for improving resolution of frequency-dependent objects in radar contexts will be provided in connection with FIG. 5.

FIG. 1 illustrates an exemplary system 100 for improving resolution of frequency-dependent objects in radar contexts. As illustrated in FIG. 1, system 100 includes and/or represents a radar device 104 and circuitry 106. In some examples, radar device 104 is configured to transmit a radar signal 112 and subsequently receive a return 114 of radar signal 112. In one example, radar signal 112 bounces off and/or is reflected by one or more objects and/or features in the surrounding environment. In this example, return 114 is the result of radar signal 112 bouncing off and/or being reflected by one or more objects and/or features in the surrounding environment. Accordingly, return 114 constitutes and/or represents the reflection of radar signal 112 after having bounced off one or more objects and/or features, such as frequency-dependent objects 110(1)-(N).

In some examples, circuitry 106 is communicatively coupled to and/or integrated into radar device 104. In one example, radar device 104 is aimed and/or directed toward the environment in which one or more of frequency-dependent objects 110(1)-(N) are located. In this example, frequency-dependent objects 110(1)-(N) have and/or exhibit reflection and/or scattering coefficients that vary and/or change depending on the frequency of radar signal 112 (e.g., either from frequency-selective surfaces or from collections of multiple unresolved scattering surfaces). The varying reflection and/or scattering coefficients of frequency-dependent objects 110(1)-(N) cause return 114 to change in one way or another relative to radar signal 112, thereby potentially resulting in and/or leading to inaccurate and/or imprecise readings or measurements (unless such coefficients are properly compensated and/or accounted for by circuitry 106).

In some examples, circuitry 106 is configured to generate a data set 116(1) representative of a range profile based at least in part on radar signal 112 and/or return 114. In one example, circuitry 106 is further configured to generate a data set 116(N) representative of a shifted version of the range profile by applying a matched filter to radar signal 112 and/or return 114. Additionally or alternatively, circuitry 106 is further configured to generate data set 116(N) representative of the range profile by shifting and/or offsetting the phase of radar signal 112 and/or return 114.

In some examples, circuitry 106 is configured to detect and/or resolve one or more scattering surfaces and/or components associated with one of frequency-dependent objects 110(1)-(N) in the range profile based at least in part on data sets 116(1)-(N). In one example, circuitry 106 is configured to characterize one or more of the scatterers comprising one of frequency-dependent objects 110(1)-(N) based at least in part on data sets 116(1)-(N). For example, circuitry 106 may characterize the polarization scattering response of scattering components whose responses have a frequency dependency in the aggregate. In this example, circuitry 106 performs and/or completes such a characterization by resolving and/or compensating for the frequency dependence of one or more of objects 110(1)-(N).

In another example, circuitry 106 performs and/or completes such a characterization by mitigating and/or eliminating depolarization across polarimetric channels of radar device 104. In a further example, circuitry 106 performs and/or completes such a characterization by resolving, identifying, and/or discovering one or more component scatterers of one of frequency-dependent objects 110(1)-(N) that were previously unintelligible and/or obscured in the profile range. Additionally or alternatively, circuitry 106 performs and/or completes such a characterization by increasing and/or improving the resolution of one or more of frequency-dependent objects 110(1)-(N) in the profile range.

As a specific example, by increasing the resolution, circuitry 106 may perform and/or achieve more precise ranging of one or more component scatterers of frequency-dependent objects 110(1)-(N). For example, by increasing the resolution, circuitry 106 may calculate and/or estimate more precise and/or accurate representations of the distance between radar device 104 and one or more of frequency-dependent objects 110(1)-(N) or their previously unresolved components. For example, circuitry 106 may detect one or more scattering components of frequency-dependent object 110(1) based at least in part on data sets 116(1)-(N). As a result, circuitry 106 may perform and/or achieve improved filtering out of certain ranges and/or locations (e.g., range resolution cells) and/or one or more of frequency-dependent objects 110(1)-(N) and/or their components from the range profile.

In some examples, circuitry 106 accurately determines and/or estimates the distance between radar device 104 and one or more of frequency-dependent objects 110(1)-(N) based at least in part on data sets 116(1)-(N). For example, circuitry 106 detects the distance between radar device 104 and one or more of frequency-dependent objects 110(1)-(N) based at least in part on data sets 116(1)-(N). In this example, circuitry 106 increases and/or improves the resolution of the distance between radar device 104 and one or more of frequency-dependent objects 110(1)-(N) based at least in part on data sets 116(1)-(N).

In some examples, circuitry 106 may include, implement, and/or apply one or more filters 118(1)-(N) capable of processing radar signal 112 and/or return 114 in one way or another. Examples of filters 118(1)-(N) include, without limitation, matched filters, ranging filters, Gram Schmidt filters, polarization filters, convolution filters, inversion filters, combinations or variations of one or more of the same, and/or any other suitable filters.

In some examples, circuitry 106 may generate, create, and/or produce data set 116(1) by applying one or more of filters 118(1)-(N) to radar signal 112 and/or return 114. For example, circuitry 106 may apply and/or implement a matched filter on radar signal 112 and/or return 114 to correlate radar signal 112 and return 114 with one another. In this example, the correlation between radar signal 112 and return 114 may render data set 116(1) representative of the range profile targeted and/or detected by radar device 104.

In some examples, circuitry 106 may generate, create, and/or produce data set 116(N) by shifting the matched filter by a certain offset. For example, circuitry 106 may include and/or implement another matched filter that is shifted and/or offset from the matched filter that rendered data set 116(1). In this example, circuitry 106 may apply the shifted and/or offset matched filter to data set 116(1) to generate data set 116(N). Additionally or alternatively, circuitry 106 may apply the shifted and/or offset matched filter to radar signal 112 and/or return 114 to generate data set 116(N).

In some examples, radar device 104 may include and/or implement any of a variety of suitable radar technologies. For example, radar device 104 may include and/or implement linear frequency modulated (LFM) waveform technology. Additional examples of radar device 104 include, without limitation, millimeter-wave (mmWave) radar devices, frequency-modulated continuous-wave (FMCW) radar devices, sinusoidal-wave radar devices, sawtooth-wave radar devices, triangle-wave radar devices, square-wave radar devices, pulse radar devices, chirp radar devices, variations or combinations of one or more of the same, and/or any other suitable radar devices.

In some examples, radar device 104 may transmit frequency-modulated radar signals toward frequency-dependent objects 110(1)-(N). Additionally or alternatively, radar device 104 may receive and/or detect frequency-modulated radar signals returned from and/or reflected by frequency-dependent objects 110(1)-(N). In one example, radar device 104 may include and/or or implement an antenna 108 and/or one or more additional antennas that facilitate transmitting and/or receiving such radar signals. In certain implementations, radar device 104 may represent and/or be deployed in a system with multiple transmit polarizations (e.g., orthogonal polarizations) and/or multiple receive polarizations (e.g., orthogonal polarizations).

In some examples, circuitry 106 may include and/or represent one or more electrical and/or electronic circuits capable of processing, applying, modifying, transforming, displaying, transmitting, receiving, and/or executing data for system 100. In one example, circuitry 106 may process the signal reflections received by radar device 104 and/or detect one or more of frequency-dependent objects 110(1)-(N) based at least in part on the signal reflections. In this example, circuitry 106 may generate and/or modify data representative of ranging measurements and/or readings based at least in part on the signal reflections. Additionally or alternatively, circuitry 106 may provide such ranging data for visual presentation and/or further processing in connection with system 100.

In some examples, circuitry 106 may launch, perform, and/or execute certain executable files, code snippets, and/or computer-readable instructions to facilitate and/or support improving the resolution of frequency-dependent objects 110(1)-(N) in radar contexts. Although illustrated as a single unit in FIG. 1, circuitry 106 may include and/or represent a collection of multiple processing units and/or electrical or electronic components that work and/or operate in conjunction with one another. In one example, circuitry 106 may include and/or represent one or more application-specific integrated circuit (ASICs). In another example, circuitry 106 may include and/or represent one or more central processing unit (CPUs). Additional examples of circuitry 106 include, without limitation, processing devices, microprocessors, microcontrollers, graphics processing units (GPUs), field-programmable gate arrays (FPGAs), systems on chips (SoCs), parallel accelerated processors, tensor cores, integrated circuits, chiplets, optical modules, receivers, transmitters, transceivers, optical modules, antennas, portions of one or more of the same, variations or combinations of one or more of the same, and/or any other suitable circuitry. In certain implementations, some or all of circuitry 106 may be incorporated and/or integrated into radar device 104.

In some examples, radar signal 112 may be represented as $x(t)=e^{j2\pi ft}(u(t)-u(t-\tau))$. In one example, return 114 may be represented as $r(t)=\alpha e^{j2\pi f(t-t_d)}(u(t-t_d)-u(t-(\tau+t_d)))$, where $t_d$ corresponds to and/or symbolizes a time delay in connection with a reflection and/or scattering coefficient $\alpha$. In a specific example with two frequency-dependent targets having complex reflection and/or scattering coefficients $\alpha$ and $\beta$, return 114 may be represented as $r(t)=\alpha e^{j2\pi f(t-t_d)}(u(t)-u(t-\tau))+\beta e^{j2\pi f(t-t_d)}(u(t-t_d)-u(t-(\tau+t_d))$, where only the relative shift and/or offset between the reflectors and/or targets is considered.

In some examples, the polarization ratio of frequency-dependent responses and/or reflections across polarimetric channels of radar device 104 may be represented as $$\rho = \frac{\alpha_x X(\omega)}{\alpha_y X(\omega)} = \frac{\alpha_x}{\alpha_y},$$

where $X(\omega)$ corresponds to and/or symbolizes the frequency response of radar signal 112. In one example, the modulating term may be eliminated and/or divided out to represent $$\rho(n) = \frac{\alpha_x}{\alpha_y},$$

when $n=n_d$ and $n_d$ is an integer, and $$\rho(n)=\frac{\alpha_x+\beta_x e^{-j\omega_m n_d}}{\alpha_y+\beta_y e^{-j\omega_m n_d}},$$

when $n+1\le n_d<n_\tau$, where $n_\tau=\tau F_S$, $$\omega_m=2\pi\frac{f_m}{F_s},$$

and $F_S$ is the sampling frequency. In certain implementations, the introduction of a sub-resolution reflector or target, such as one or more of frequency-dependent objects 110(1)-(N), may cause and/or produce a different polarimetric response for every frequency component.

Figure 2:
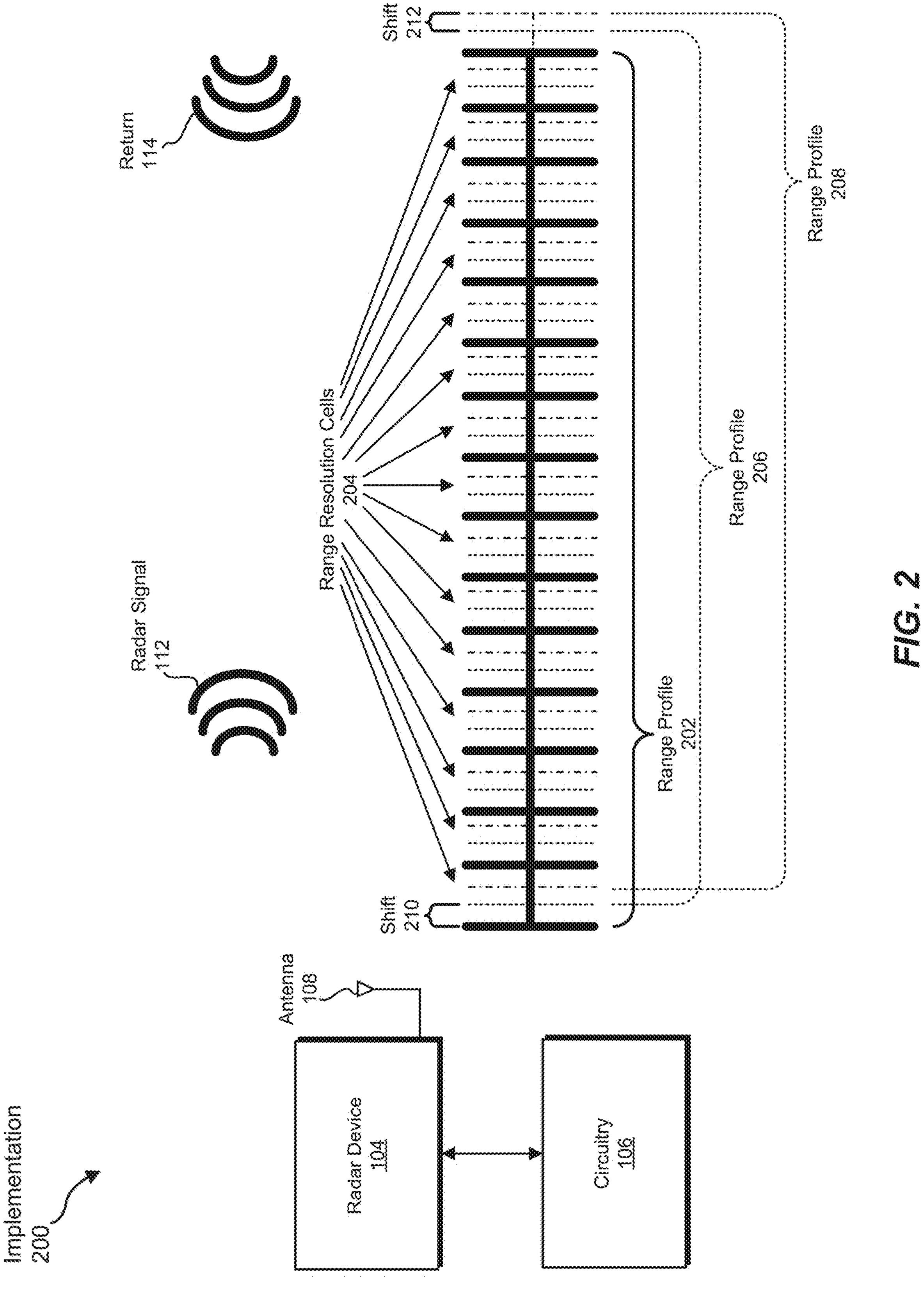
FIG. 2 is an illustration of an exemplary implementation of a system for improving resolution of frequency-dependent objects in radar contexts according to one or more embodiments of this disclosure.

FIG. 2 illustrates an exemplary implementation 200 of a system for improving resolution of frequency-dependent objects in radar contexts. In some examples, implementation 200 may include and/or represent certain devices, components, and/or features that perform and/or provide functionalities that are similar and/or identical to those described above in connection with FIG. 1. As illustrated in FIG. 2, implementation 200 may include and/or involve system 100 characterizing one or more of frequency-dependent objects 110(1)-(N) detected in a range profile 202 based at least in part on data sets 116(1)-(N).

In some examples, range profile 202 may include and/or represent range resolution cells 204 corresponding to discrete ranges and/or distances from radar device 104. In one example, the shift used to generate data set 116(N) from data set 116(1), radar signal 112, and/or return 114 may include and/or represent an offset corresponding to a fraction of the size of one of range resolution cells 204. For example, if range resolution cells 204 each represent a 2.4-meter step, the shift and/or offset applied to data set 116(1) to generate data set 116(N) may be a fraction of that 2.4-meter step.

In some examples, data set 116(1) may include and/or represent a collection of samples based at least in part on radar signal 112 and/or return 114. In one example, the collection of samples may correspond to and/or represent discrete ranges and/or distances measured from radar device 104. Additionally or alternatively, circuitry 106 may apply one or more matched filters to each sample included in the collection to correlate radar signal 112 with return 114 over and/or relative to range profile 202.

In some examples, circuitry 106 resolves the frequency dependence of one or more of objects 110(1)-(N) based at least in part on their reflection and/or scattering coefficients. For example, circuitry 106 determines and/or calculates a first instance of the reflection and/or scattering coefficient of one or more of frequency-dependent objects 110(1)-(N). In this example, circuitry 106 also determines and/or calculates a second instance of the reflection and/or scattering coefficient of the frequency-dependent object(s). The first instance of the reflection and/or scattering coefficient may correspond to and/or represent a certain frequency of radar signal 112, and the second instance of the reflection and/or scattering coefficient may correspond to and/or represent a different frequency of radar signal 112.

In some examples, circuitry 106 may increase and/or improve the resolution of the distance between radar device 104 and one or more of objects 110(1)-(N) based at least in part on their frequency dependences and/or the relationship between the first and second instances of the reflection and/or scattering coefficients. In one example, circuitry 106 may modify range profile 202 to account and/or compensate for the frequency dependence of one or more of objects 110(1)-(N).

In some examples, circuitry 106 may identify and/or locate a remote range resolution cell in which no objects are detected. For example, circuitry 106 may identify and/or locate a remote range resolution cell from little, if any, energy from radar signal 112 is returned to radar device 104. In one example, circuitry 106 may identify and/or determine a matched filter that corresponds to and/or is associated with that remote range resolution cell. In this example, circuitry 106 may repurpose and/or modify the matched filter corresponding to that remote range resolution cell for application on a closer range resolution cell and/or as part of a sub-resolution region or cell. Additionally or alternatively, circuitry 106 may increase and/or improve the resolution of the additional range resolution cell based at least in part on the repurposed and/or modified matched filter.

In some examples, circuitry 106 may develop and/or generate a range profile 202 by applying a matched filter to radar signal 112 and/or return 114. In one example, range profile 202 may be represented as and/or correspond to data set 116(1). In this example, the matched filter may render and/or output data set 116(1) as a representation of range profile 202.

In some examples, circuitry 106 may develop and/or generate a range profile 206 by applying a shifted version of the matched filter to radar signal 112 and/or return 114. In one example, range profile 206 may be represented as and/or correspond to data set 116(N). In this example, the shifted matched filter may render and/or output data set 116(N) as a representation of range profile 206. Additionally or alternatively, range profile 206 may correspond to and/or represent a shift 210 relative to range profile 202.

In some examples, circuitry 106 may develop and/or generate a range profile 208 by applying a different shifted version of the matched filter to radar signal 112 and/or return 114. In one example, range profile 208 may be represented as and/or correspond to another data set. In this example, the differently shifted matched filter may render and/or output the other data set as a representation of range profile 208. Additionally or alternatively, range profile 208 may correspond to and/or represent a shift 212 relative to range profile 206 and/or a combination of shifts 210 and 212 relative to range profile 202.

Figure 3:
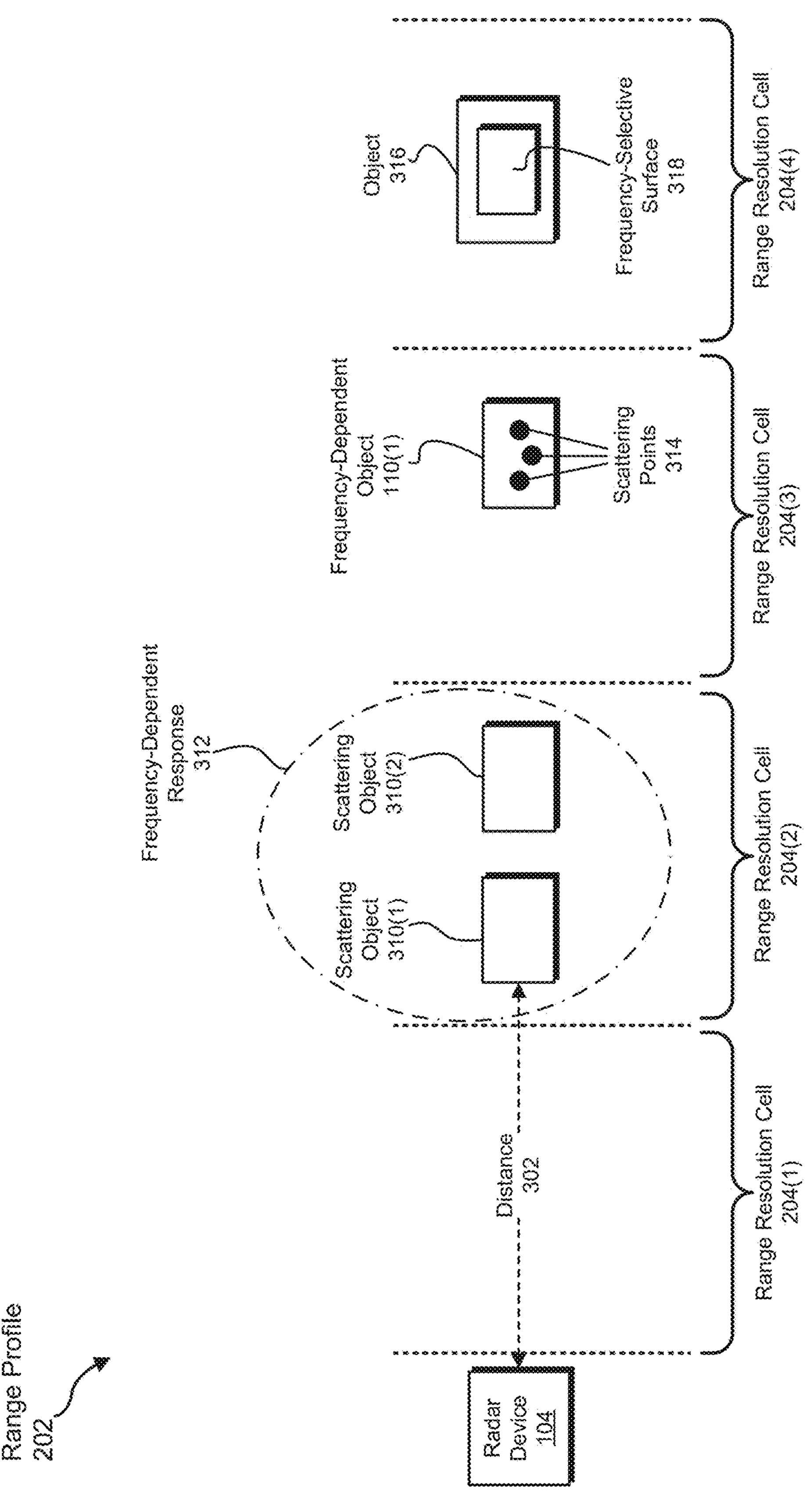
FIG. 3 is an illustration of an exemplary range profile that includes multiple range resolution cells in which frequency-dependent objects are detected according to one or more embodiments of this disclosure.

FIG. 3 illustrates an exemplary implementation of range profile 202 detected and/or developed relative to radar device 104. In some examples, range profile 202 may include and/or represent certain objects, components, and/or features that perform and/or provide functionalities that are similar and/or identical to those described above in connection with either FIG. 1 or FIG. 2. As illustrated in FIG. 3, range profile 202 may include and/or represent at least range resolution cells 204(1), 204(2), 204(3), 204(4). In certain implementations, range profile 202 may also include and/or represent other range resolution cells that are not illustrated in FIG. 3.

In some examples, range profile 202 may include and/or represent scattering objects 310(1) and 310(2), frequency-dependent object 110(1), and/or object 316. For example, scattering objects 310(1) and 310(2) may be located and/or positioned in range resolution cell 204(2) of range profile 202. In one example, scattering objects 310(1) and 310(2) may include and/or represent a collection of surfaces that lead to and/or produce a frequency-selective response and/or a frequency-dependent response 312. In another example, frequency-dependent object 110(1) may be located and/or positioned in range resolution cell 204(3) of range profile 202. In this example, frequency-dependent object 110(1) may include and/or represent multiple scattering points 314 (e.g., multiple unresolved scatterers).

In some examples, object 316 may be located and/or positioned in range resolution cell 204(4) of range profile 202. In one example, object 316 may include and/or represent a frequency-selective surface 318. In this example, frequency-selective surface 318 may lead to and/or produce a frequency-dependent response from object 316. Additionally or alternatively, no detectable objects may be located and/or positioned in range resolution cell 204(1) of range profile 202.

In some examples, circuitry 106 may accurately determine and/or estimate a distance 302 between radar device 104 and frequency-dependent object 110(1) in range resolution cell 204(2) based at least in part on data sets 116(1)-(N). For example, circuitry 106 may detect a less accurate and/or precise distance between radar device 104 and frequency-dependent object 110(1) based at least in part on data set 116(1). In this example, circuitry 106 may increase and/or improve the resolution of that distance by accounting and/or compensating for the frequency dependence of object 110(1) in view of data sets 116(1)-(N). The result of increasing the resolution in this way may render distance 302 with improved accuracy and/or precision.

In some examples, circuitry 106 may generate a convolution matrix with values corresponding to select ranges of interest from range profile 202 based at least in part on return 114. For example, the select ranges of interest may include and/or represent one or more of range resolution cells 204(1)-(4). As a specific example, circuitry 106 may detect one and/or more blips within the environment targeted by radar device 104 and/or within range profile 202. In this example, return 114 may indicate, to circuitry 106, that range resolution cells 204(2) and 204(3) could potentially include and/or contain one or more objects.

In some examples, circuitry 106 may resolve the relationship and/or correlation between the first and second instances of the reflection and/or scattering coefficients by processing the convolution matrix. In one example, circuitry 106 may apply a Gram Schmidt filter—sometimes referred to as a Gram Schmidt convolution matrix (GSCM) filter—to the convolution matrix to filter out and/or remove one or more of frequency-dependent objects 110(1)-(3) from range profile 202 without significantly affecting the readings and/or measurements of other targets and/or reflectors. By doing so, circuitry 106 may be able to isolate ranging readings and/or measurements for a specific frequency-dependent target and/or set of unresolved reflectors and/or objects. Additionally or alternatively, circuitry 106 may detect and/or more precisely range one of the frequency-dependent targets and/or reflectors that remain in range profile 202 upon filtering out and/or removing the others. Accordingly, circuitry 106 may increase and/or improve the resolution of the remaining and/or isolated frequency-dependent targets and/or reflectors upon filtering out and/or removing the others.

In certain examples, circuitry 106 may detect and/or identify a previously unintelligible, unknown, and/or unresolved frequency-dependent target and/or reflector by applying at least one matched filter and at least one shifted and/or offset matched filter to data sets 116(1)-(N). For example, circuitry 106 may feed data set 116(1) to a matched filter and/or a shifted or offset version of that matched filter. Additionally or alternatively, circuitry 106 may apply a range filter corresponding to range resolution cell 204(3) to one or more of data sets 116(1)-(N) to filter out and/or remove frequency-dependent object 110(3). Similarly, circuitry 106 may apply a range filter corresponding to range resolution cell 204(2) to one or more of data sets 116(1)-(N) to filter out and/or remove frequency-dependent objects 110(1) and 110(2).

In some examples, circuitry 106 may mitigate, eliminate, and/or remove depolarization across polarimetric channels of radar device 104 based at least in part on the relationship and/or correlation between the first and second instances of the reflection and/or scattering coefficients. In other words, circuitry 106 may mitigate and/or eliminate depolarization across the polarimetric channels of radar device 104 by accounting and/or compensating for the frequency dependence of one or more of objects 110(1)-(3). In one example, circuitry 106 may mitigate, eliminate, and/or remove noise and/or static interference in one of the select ranges of interest via range filtering. In this example, circuitry 106 may resolve one or more of frequency-dependent objects 110(1)-(3) in range resolution cell 204(2) or 204(3) via range filtering.

In some examples, circuitry 106 may characterize the frequency dependence of one or more of objects 110(1)-(3) using one or more convolution matrices. For example, circuitry 106 may generate and/or populate a convolution matrix that facilitates radar processing for linear time-invariant modeling of environments with frequency-dependent reflections. In one example, circuitry 106 may generate and/or populate vectors with samples of radar signal 112 and/or return 114. As a specific example, circuitry 106 may collect and/or store samples of radar signal 112 as $x=[x_0, x_1 \ldots x_{N-2}\ x_{N-1}]^T$, where $N=T_0F_S$ and $T_0$ is equal to the clock and/or look duration. In this example, circuitry 106 may collect and/or store samples of return 114 as $x_{n_d}=[x_{N-n_d-1}\ x_{N-n_d} \ldots x_{N-n_d-2}]^T$. Additionally or alternatively, circuitry 106 may collect And and/or store the vector representing return 114 from a single reflector and/or target as $r=\alpha x_{n_d}$.

In some examples, circuitry 106 may generate and/or populate a convolution matrix with all possible delays corresponding to particular ranges represented by shifts and/or offsets (e.g., $X=[x_0\ x_1 \ldots x_{N-2}\ x_{N-1}]$, where x(n) corresponds to and/or symbolizes samples of radar signal 112). For a given arbitrary offset, circuitry 106 may determine and/or calculate another convolution matrix by shifting and/or offsetting x. In one example, circuitry 106 may repeat this process for an infinite number of offsets such that return 114 is represented as $r=X_a+X_{o1a_{o1}}+X_{o2a_{o2}} \ldots$, where $a_{ok}$ corresponds to and/or symbolizes the vectors of reflection and/or scattering coefficients at the corresponding locations. Additionally or alternatively, circuitry 106 may store and/or represent the vectors of reflection and/or scattering coefficients as $a_{ok}=[a_o, a_1 \ldots a_{N-2}\ a_{N-1}]^T$.

In some examples, circuitry 106 may be able to process radar readings and/or measurements for up to N targets and/or reflectors. In one example, L targets and/or reflectors may be unintelligible, unknown, and/or unresolved between each resolved target and/or reflector used in in the convolution model. For example, a matched filter may output and/or produce a result with a length of N(L+1). In this example, the columns of the different convolution matrices may correspond to and/or represent different ranges and/or locations in range profile 202.

In some examples, circuitry 106 may select certain ranges and/or locations of interest by constructing a matrix of N columns corresponding to those locations. In one example, this matrix with N columns may be represented as $$X_S = [\, x^1 \;\; x_{o1}^1 \;\; \ldots \,],$$

where the x corresponds to and/or symbolizes the column vectors, the subscript corresponds to and/or represents the respective convolution matrices, and the superscript corresponds to and/or represents the column index within the convolution matrix.

In some examples, circuitry 106 may select the number of modeling parameters and/or dimensions to be estimated (e.g., k reflectors and/or targets). In one example, circuitry 106 may select the number of associated columns from the different convolution matrices to form matrix $X_S$ of dimension k×N. In this example, circuitry 106 may apply a least squares technique in which the estimate is represented as $$a_s = \left(X_s^H X_s\right)^{-1} X_s^H r.$$

If two reflectors and/or targets within a sampling interval introduce frequency-dependent responses, circuitry 106 may be able to distinguish between those two reflectors and/or targets with an appropriately constructed 2×N matrix, thereby resolving the frequency-dependent effects of those two reflectors and/or targets and/or the corresponding depolarization.

In some examples, circuitry 106 may apply a Gram Schmidt convolution matrix to eliminate range specific interference and/or clutter. For example, circuitry 106 may sample the return from a radar waveform transmission. In one example, since the transmission is known by orthogonalizing particular columns of a convolution matrix, circuitry 106 may be able to completely eliminate certain reflectors and/or scattering components without any knowledge of the environment. The effect of this elimination technique may be uniform across all channels. As a result, if circuitry 106 applies a Gram Schmidt convolution matrix filter across all the polarimetric channels, the polarization of the ranges may remain unaltered and/or unaffected.

In one example, circuitry 106 may select which distances and/or corresponding convolution matrix columns to remove. Once those columns are removed, circuitry 106 may form an orthogonal basis for the subspace spanned by those columns. To do so, circuitry 106 may implement the following:

$$x_f^k = x_s - \frac{x_f^{(k-1)H} x_s}{x_f^{(k-1)H} x_f^{k-1}} - \ldots - \frac{X_f^{1H} X_s}{X_f^{1H} X_f^1},$$

where the subscript f represents the vectors used for filtering and the superscript represents the index in the filtering basis $X_f$. In one example, the filtering basis may be represented as $$X_f = \left[x_f^1 \ldots \, x_f^F\right],$$

where F corresponds to the size of the filtering basis. In this example, circuitry 106 may filter the returns via the columns of $X_f$ using the following:

$$y = r - \frac{X_f^{FH} r}{X_f^{FH} X_f^F} - \ldots - \frac{X_f^{1H} r}{X_f^{1H} X_f^1}.$$

Figure 4:
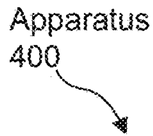
FIG. 4 is an illustration of an exemplary apparatus for improving resolution of frequency-dependent objects in radar contexts according to one or more implementations of this disclosure.
Figure 4:
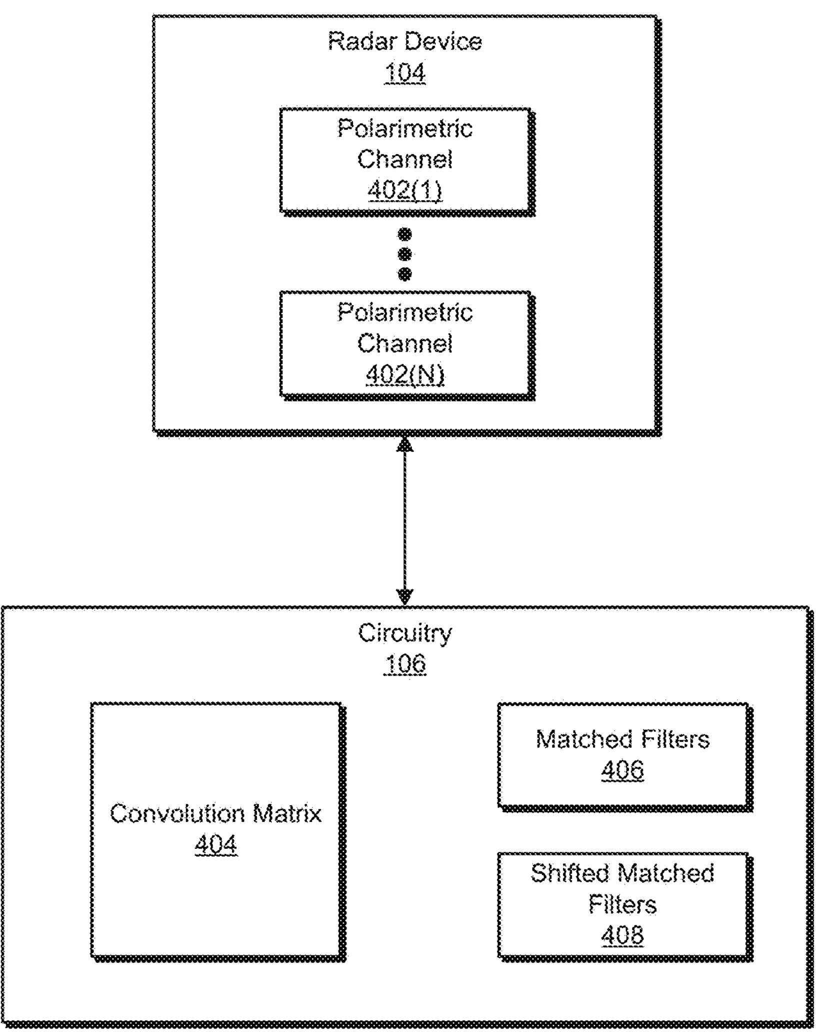

FIG. 4 illustrates an exemplary apparatus 400 for improving resolution of frequency-dependent objects in radar contexts. In some examples, apparatus 400 may include, involve, and/or represent certain devices, components, and/or features that perform and/or provide functionalities that are similar and/or identical to those described above in connection with any of FIGS. 1-3. In certain implementations, the systems described above in connection with any of FIGS. 1-3 may additionally include, involve, and/or represent devices, components, and/or features that are similar and/or identical to those described below in connection with FIG. 4.

In some examples, apparatus 400 may include and/or represent radar device 104 and circuitry 106. In one example, radar device 104 may include and/or implement polarimetric channels 402(1)-(N). Additionally or alternatively, circuitry 106 may generate and/or implement a convolution matrix 404 using matched filters 406 and/or shifted matched filters 408. In this example, circuitry 106 may process convolution matrix 404 to mitigate, process, and/or remove depolarization from polarimetric channels 402(1)-(N).

In some examples, circuitry 106 may modify and/or change range profile 202 to increase resolution of object detection and/or ranging. Additionally or alternatively, circuitry 106 may mitigate and/or remove static interference or noise in certain ranges of interest represented in range profile 202 via range filtering. As a result of this mitigation and/or removal, circuitry 106 may be able to identify, detect, characterize (e.g., the polarization response), and/or resolve previously unintelligible and/or obscured objects in one of those ranges of interest.

In some examples, the various apparatuses, devices, and systems described in connection with FIGS. 1-4 may include and/or represent one or more additional circuits, components, and/or features that are not necessarily illustrated and/or labeled in FIGS. 1-4. For example, the apparatuses, devices, and systems illustrated in FIGS. 1-4 may also include and/or represent additional analog and/or digital circuitry, onboard logic, transistors, radar devices, radio-frequency (RF) transmitters, RF receivers, transceivers, antennas, resistors, capacitors, diodes, inductors, switches, registers, flipflops, digital logic, connections, traces, buses, semiconductor (e.g., silicon) devices and/or structures, processing devices, storage devices, circuit boards, sensors, packages, substrates, housings, combinations or variations of one or more of the same, and/or any other suitable components. In certain implementations, one or more of these additional circuits, components, and/or features may be inserted and/or applied between any of the existing circuits, components, and/or features illustrated in FIGS. 1-4 consistent with the aims and/or objectives described herein. Accordingly, the couplings and/or connections described with reference to FIGS. 1-4 may be direct connections with no intermediate components, devices, and/or nodes or indirect connections with one or more intermediate components, devices, and/or nodes.

In some examples, the phrase "to couple" and/or the term "coupling," as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

In some examples, one or more components and/or features illustrated in FIGS. 1-4 may be excluded and/or omitted from the various apparatuses, devices, and/or systems described in connection with FIGS. 1-4. Moreover, although these apparatuses, devices, and/or systems are often described above in terms of their configurations and/or capabilities, these apparatuses, devices, and/or systems may also actually perform any of the functionalities, behaviors, and/or services associated with those configurations and/or capabilities. For example, a radar device configured to transmit and receive radar signals may also actually do so. Conversely, although these apparatuses, devices, and/or systems are often described above in terms of their functionalities, behaviors, and/or services, these apparatuses, devices, and/or systems may also actually be configured to perform such functionalities, behaviors, and/or services.

Figure 5:
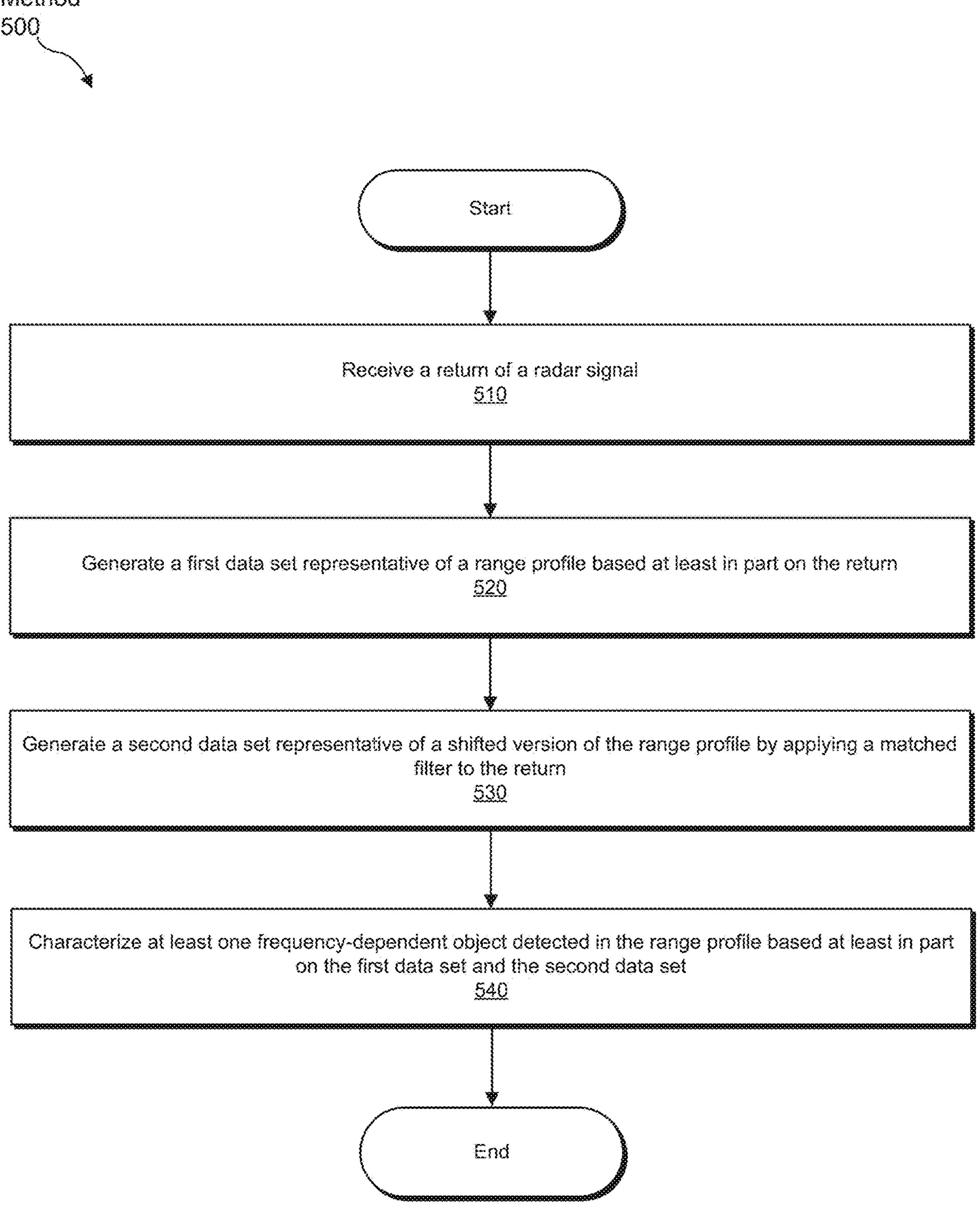
FIG. 5 is a flow diagram of an exemplary method for improving resolution of frequency-dependent objects in radar contexts according to one or more implementations of this disclosure.

FIG. 5 is a flow diagram of an exemplary method 500 for operating and/or running apparatuses, devices, or systems capable of improving resolution of frequency-dependent objects in radar contexts. In one example, the steps shown in FIG. 5 may be achieved and/or accomplished by radar equipment. Additionally or alternatively, the steps shown in FIG. 5 may incorporate and/or involve certain sub-steps and/or variations consistent with the descriptions provided above in connection with FIGS. 1-4.

As illustrated in FIG. 5, method 500 may include the step of receiving a return of a radar signal (510). Step 510 may be performed in a variety of ways, including any of those described above in connection with FIGS. 1-4. For example, a radar device may transmit a radar signal that is reflected back toward the radar device. In this example, the reflection may constitute and/or represent a return of the radar signal that is received by the radar device.

Method 500 may also include the step of generating a first data set representative of a range profile based at least in part on the return (520). Step 520 may be performed in a variety of ways, including any of those described above in connection with FIGS. 1-4. For example, circuitry communicatively coupled to the radar device may generate a first data set based at least in part on the radar signal and/or the return. In this example, the first set of data may correspond to and/or represent a range profile of the environment targeted by and/or surrounding the radar device.

Method 500 may also include the step of generating a second data set representative of the range profile by applying at least one shift to the first data set (530). Step 530 may be performed in a variety of ways, including any of those described above in connection with FIGS. 1-4. For example, the circuitry may generate a second data set representative of the range profile by applying at least one shift and/or offset to the first data set.

Method 500 may further include the step of characterizing at least one frequency-dependent object detected in the range profile based at least in part on the first data set and the second data set (540). Step 540 may be performed in a variety of ways, including any of those described above in connection with FIGS. 1-4. For example, the circuitry may characterize at least one frequency-dependent object detected in the range profile based at least in part on the first data set and the second data set.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
- a radar device configured to transmit a radar signal and receive a return of the radar signal; and
- circuitry configured to:
  - generate a first data set representative of a range profile based at least in part on the return,
  - wherein the range profile comprises a plurality of range resolution cells corresponding to discrete ranges from the radar device;
  - identify, within the plurality of range resolution cells, a remote range resolution cell in which no objects are detected;
  - identify a matched filter corresponding to the remote range resolution cell in which no objects are detected;
  - repurpose the matched filter for an additional range resolution cell in which the at least one frequency-dependent object is detected;
  - increase a resolution of the additional range resolution cell based at least in part on the repurposed matched filter;
  - generate a second data set representative of a shifted version of the range profile by applying the repurposed matched filter to the return; and
  - characterize at least one frequency-dependent object detected in the range profile based at least in part on the first data set and the second data set.

2. The system of claim 1, wherein the circuitry is further configured to determine a distance between the radar device and the at least one frequency-dependent object detected in the range profile based at least in part on the first data set and the second data set.

3. The system of claim 2, wherein the circuitry is further configured to:
- detect the distance between the radar device and the at least one frequency-dependent object based at least in part on the first data set; and increase a resolution of the distance between the radar device and the at least one frequency-dependent object based at least in part on the first data set and the second data set.

4. The system of claim 3, wherein the circuitry is further configured to:

determine a first reflection coefficient of the at least one frequency-dependent object based at least in part on the first data set;

determine a second reflection coefficient of the at least one frequency-dependent object based at least in part on the second data set; and increase the resolution of the distance between the radar device and the at least one frequency-dependent object based at least in part on a relationship between the first reflection coefficient and the second reflection coefficient.

5. The system of claim 4, wherein the circuitry is further configured to:

generate a convolution matrix with values corresponding to select ranges of interest from the range profile based at least in part on the return; and resolve the relationship between the first reflection coefficient and the second reflection coefficient based at least in part on the convolution matrix.

6. The system of claim 5, wherein the circuitry is further configured to mitigate depolarization from polarimetric channels of the radar device based at least in part on the relationship.

7. The system of claim 5, wherein the circuitry is further configured to modify the range profile to account for a frequency dependence of the frequency-dependent object based at least in part on the relationship.

8. The system of claim 5, wherein the circuitry is further configured to:

mitigate noise in one of the select ranges of interest via range filtering; and resolve at least one additional frequency-dependent object in the one of the select ranges of interest via range filtering.

9. The system of claim 1, wherein the circuitry is further configured to:

generate a convolution matrix with values corresponding to select ranges of interest from the radar device based at least in part on the return; and apply a Gram Schmidt filter to the convolution matrix to filter out at least one additional frequency-dependent object from the range profile.

10. The system of claim 9, wherein the circuitry is further configured to detect at least one further object in the range profile upon filtering out the at least one additional frequency-dependent object.

11. The system of claim 1, wherein the circuitry is further configured to:

generate the first set of data by applying a first matched filter to the return; and generate the second set of data by shifting the first matched filter by at least one offset to form the matched filter.

12. The system of claim 11, wherein the circuitry is further configured to detect at least one additional frequency-dependent object in the range profile by applying the first matched filter and the matched filter to the first set of data and the second set of data.

13. The system of claim 11, wherein the offset corresponds to a fraction of the size of each of the plurality of range resolution cells.

14. The system of claim 13, wherein:

the first set of data comprises a collection of samples that:

are based at least in part on the radar signal and the return; and correspond to the discrete ranges; and the circuitry is further configured to apply at least one matched filter to each sample included in the collection of samples.

15. The system of claim 1, wherein the circuitry is further configured to determine a distance between the radar device and one or more scattering components associated with the at least one frequency-dependent object based at least in part on the first data set and the second data set.

16. The system of claim 1, wherein the circuitry is further configured to characterize a polarization response of the frequency-dependent object based at least in part on the first data set and the second data set.

17. An apparatus comprising:

a radar device configured to transmit a radar signal and receive a return of the radar signal via one or more polarimetric channels; and circuitry configured to:

generate a first data set representative of a range profile based at least in part on the return, the range profile comprising a plurality of range resolution cells corresponding to discrete ranges from the radar device;

generate a second data set representative of a shifted version of the range profile by applying the repurposed matched filter to the return;

identify, within the plurality of range resolution cells, a remote range resolution cell in which no objects are detected;

identify a matched filter corresponding to the remote range resolution cell in which no objects are detected;

repurpose the matched filter for an additional range resolution cell in which the at least one frequency-dependent object is detected;

increase a resolution of the additional range resolution cell based at least in part on the repurposed matched filter; and characterize at least one frequency-dependent object detected in the range profile based at least in part on the first data set and the second data set.

18. The apparatus of claim 17, wherein the circuitry is further configured to determine a distance between the radar device and the at least one frequency-dependent object detected in the range profile based at least in part on the first data set and the second data set.

19. A method comprising:

receiving, by a radar device, a return of a radar signal;

generating, by circuitry communicatively coupled to the radar device, a first data set representative of a range profile based at least in part on the return, the range profile comprising a plurality of range resolution cells corresponding to discrete ranges from the radar device;

generating, by the circuitry, a second data set representative of a shifted version of the range profile by applying a matched filter to the return; and identifying, within the plurality of range resolution cells, a remote range resolution cell in which no objects are detected;

identifying a matched filter corresponding to the remote range resolution cell in which no objects are detected;

repurposing the matched filter for an additional range resolution cell in which the at least one frequency-dependent object is detected;

increasing a resolution of the additional range resolution cell based at least in part on the repurposed matched filter; and characterizing, by the circuitry, at least one frequency-dependent object detected in the range profile based at least in part on the first data set and the second data set.

* * * * *